United States Patent
Meunier et al.

(10) Patent No.: US 8,593,670 B2
(45) Date of Patent: Nov. 26, 2013

(54) AUTOMATIC GENERATION OF DEVICE-CENTRIC DISTRIBUTION LISTS

(75) Inventors: Jean-Luc Meunier, St. Nazaire les Eymes (FR); Victor Ciriza, La Tour du Pin (FR); Guillaume M. Bouchard, Crolles (FR)

(73) Assignee: Xerox Corporation, Norwalk, CT (US)

(*) Notice: Subject to any disclaimer, the term of this patent is extended or adjusted under 35 U.S.C. 154(b) by 794 days.

(21) Appl. No.: 12/567,943

(22) Filed: Sep. 28, 2009

(65) Prior Publication Data

US 2011/0075191 A1    Mar. 31, 2011

(51) Int. Cl.
*G06F 3/12* (2006.01)
*G06F 15/16* (2006.01)

(52) U.S. Cl.
USPC .......................... 358/1.15; 358/1.13; 709/203

(58) Field of Classification Search
USPC .......................................................... 399/10
See application file for complete search history.

(56) References Cited

U.S. PATENT DOCUMENTS

| | | | |
|---|---|---|---|
| 5,805,830 A | 9/1998 | Reese et al. | |
| 5,990,886 A | 11/1999 | Serdy et al. | |
| 6,366,913 B1 * | 4/2002 | Fitler et al. | 709/203 |
| 6,622,266 B1 * | 9/2003 | Goddard et al. | 714/44 |
| 6,636,240 B1 | 10/2003 | Centerwall et al. | |
| 2006/0132826 A1 * | 6/2006 | Ciriza et al. | 358/1.15 |
| 2006/0206445 A1 * | 9/2006 | Andreoli et al. | 706/52 |
| 2007/0176742 A1 * | 8/2007 | Hofmann et al. | 340/7.6 |
| 2007/0268509 A1 | 11/2007 | Andreoli et al. | |

OTHER PUBLICATIONS

U.S. Appl. No. 11/137,565, filed May 26, 2005, Andreoli, et al.
U.S. Appl. No. 11/436,819, filed May 18, 2006, Andreoli, et al.
U.S. Appl. No. 12/164,384, filed Jun. 30, 2008, Meunier.
U.S. Appl. No. 12/201,093, filed Aug. 29, 2008, Bouchard, et al.
U.S. Appl. No. 12/328,276, filed Dec. 4, 2008, Bouchard, et al.

* cited by examiner

*Primary Examiner* — Marivelisse Santiago Cordero
*Assistant Examiner* — Moustapha Diaby
(74) *Attorney, Agent, or Firm* — Fay Sharpe LLP

(57) ABSTRACT

A method and system for managing distribution lists rely on the collection of job log data from shared devices, such as networked printers. For each printer, a usage community comprising users of the shared device, can be determined, based at least in part on the job log data. At least one distribution list of users is generated, based on the usage community. The distribution list can be linked with a mailer program, whereby users in the usage community are grouped together under a common contact address. Updating the distribution list at intervals to reflect changes in the usage community allows a static email address to be used for a varying group of users.

21 Claims, 5 Drawing Sheets

AUTOMATIC GENERATION OF DEVICE-CENTRIC DISTRIBUTION LISTS

CROSS REFERENCE TO RELATED PATENTS AND APPLICATIONS

The following copending applications, the disclosures of which are incorporated herein by reference in their entireties, are mentioned:

U.S. application Ser. No. 12/328,276, filed Dec. 4, 2008, entitled SYSTEM AND METHOD FOR IMPROVING FAILURE DETECTION USING COLLECTIVE INTELLIGENCE WITH END-USER FEEDBACK, by Guillaume Bouchard, et al.;

U.S. application Ser. No. 12/164,384, filed Jun. 30, 2008, entitled SERENDIPITOUS REPAIR OF SHARED DEVICE, by Jean-Luc Meunier; and U.S. application Ser. No. 12/201,093, filed Aug. 29, 2008, entitled VISUALIZATION OF USER INTERACTIONS IN A SYSTEM OF NETWORKED DEVICES, by Guillaume Bouchard, et al.

BACKGROUND

The exemplary embodiment relates to communication with users of a shared device and finds particular application in a network printing system, in which devices, such as printers, are utilized by different users.

Network printing systems may include one or several networked printers or multi-function devices (MFDs) shared by the people in an organization. Given a device, the set of people using it form a de facto user community. There are many circumstances where it would be advantageous for community members to communicate with each other. For example, it would be helpful to be able to alert other users that a large job is being printed on one printer, which would give other users the opportunity to reroute their jobs to another network printer. Or, if one printer is undergoing repair or awaiting a service call, it would be useful to let the users of that printer know. However, current print networks make this difficult. Emails sent to all the people in an organization having multiple printers would be distracting, since for many users, the information would not be applicable to them. Further, while an email distribution list could be established for a given device, it would require considerable time in setting up by printer administrators. The lists would also need regular maintenance to take account of employees moving locations within the organization or leaving the organization, the arrival of newcomers, changes in printer types and locations, and so forth. Additionally, users may use one printer for regular printing and another for color printing or jobs requiring special paper or ink. Users may also run out of consumables (ink, toner, paper, and the like) at one printer location and either send documents to another printer or search for replacement consumables at other printer locations.

The exemplary embodiment provides a system and method which, in various embodiments, address some or all of these device-centric communication problems.

INCORPORATION BY REFERENCE

The following references, the disclosures of which are incorporated herein by reference in their entireties, are mentioned:

U.S. Pub. No. 2007/0268509, published Nov. 22, 2007, entitled SOFT FAILURE DETECTION IN A NETWORK OF DEVICES, by Jean-Marc Andreoli, et al., discloses a method and apparatus for monitoring printing devices of a printing devices network. The apparatus includes a family of usage models representing typical usage of the printing devices of the printing devices network. An adaptation procedure allows selection of one model within that family, based on a printing devices usage log maintained by the printing devices network. A printing usage monitor is configured to detect deviation of logged usage of a printing device from the usage model indicative of a soft failure on that device.

U.S. Pub. No. 2006/0206445, published Sep. 14, 2006, entitled PROBABILISTIC MODELING OF SHARED DEVICE USAGE, by Jean-Marc Andreoli, et al., discloses a method for estimating parameters of a probability model that models user behavior of shared devices offering different classes of service for carrying out jobs. The method includes recording usage job data of observed users and devices carrying out the jobs, defining a probability model with an observed user variable, an observed device variable, a latent job cluster variable, and a latent job service class variable, determining a range of service classes associated with the shared devices, selecting an initial number of job clusters, learning parameters of the probability model using the recorded job usage data, the determined range of service classes, and the selected initial number of job clusters, and applying the learned parameters of the probability model to evaluate one or more of: configuration of the shared devices, use of the shared devices, and job redirection between the shared devices.

U.S. Pub. No. 2006/0132826, published Jun. 22, 2006, entitled AUTOMATED JOB DIRECTION AND ORGANIZATION MANAGEMENT, by Victor Ciriza, et al., discloses a method and apparatus for managing a plurality of communicatively coupled systems. The method includes collecting job log data, determining a user community for each of the plurality of systems using the job log data, calculating overlapping communities for pairs of the plurality of systems, and defining a redirection matrix using the overlapping communities for managing operation of the plurality of systems.

U.S. Pat. No. 6,636,240, issued Oct. 21, 2003, entitled SYSTEM AND METHOD FOR BUILDING DYNAMIC E-MAIL DISTRIBUTION LISTS FROM MULTIPLE SELECTED DOCUMENTS, by Brandt C. Centerwall, et al., discloses a method for automatically building distribution lists based on email threads, so that the people that are often copied on emails are grouped together.

U.S. Pat. No. 5,805,830, issued Sep. 8, 1998, entitled METHOD AND APPARATUS FOR MANAGING COMMUNICATIONS WITH SELECTIVE SUBSETS OF CONFERENCE PARTICIPANTS, by Ken Reese, et al., discloses logic for creation of nested distribution lists with logical constraints.

U.S. Pat. No. 5,990,886, issued Nov. 23, 1999, entitled GRAPHICALLY CREATING E-MAIL DISTRIBUTION LISTS WITH GEOGRAPHIC AREA SELECTOR ON MAP, by Holly Serdy, et al., discloses placing users on a geographic map and manually selecting a distribution list by drawing areas on the map.

BRIEF DESCRIPTION

In accordance with one aspect of the exemplary embodiment, a method includes collecting job log data for a shared device, determining a usage community comprising users of the shared device, based on the job log data, generating at least one distribution list based on the usage community, linking the distribution list with a mailer program, whereby users in the usage community are grouped together under a common contact address. The distribution list is updated to reflect a change in the usage community.

One or more of the collecting, determining, generating, linking, and updating can be performed with a computer processor.

In another aspect, a distribution list generation system includes memory which stores instructions for receiving job log data from a plurality of associated shared devices, for a first of the plurality of shared devices, determining a usage community comprising users of the first shared device, based on the job log data, generating at least one distribution list based on the usage community, updating the distribution list to reflect changes in the usage community, and outputting the distribution list to a mailer program, whereby users in the usage community are able to be grouped together under a common contact address. A processor in communication with the memory is provided for executing the instructions.

In another aspect, a method for generating device-centered distribution lists for a plurality of printers includes, for each of a plurality of shared printers, collecting job log data, determining a usage community, based on the job log data, generating at least one updatable distribution list of users based on the usage community, and providing for email addresses for at least a subset of the users listed on the distribution list to be removably linked to a static email address.

DETAILED DESCRIPTION

Aspects of the exemplary embodiment relate to a method and apparatus for generating device-centered distribution lists. While the device is described in terms of a networked printer, it is to be appreciated that the device can be any shared usage electromechanical device. The apparatus and method provide improvements in usage and repair of shared devices by facilitating communications between the device and its users as well as between users of shared devices.

The term "printer," as used herein, broadly encompasses various shared devices for rendering an image on print media, such as a copier, laser printer, bookmaking machine, facsimile machine, or a multifunction device (MFD), which includes one or more functions such as scanning, printing, archiving, emailing, and faxing. A printer may utilize a marking material, such as ink(s) or toner(s) for rendering images on print media.

The term "print medium" generally refers to a physical sheet of paper, plastic, or other suitable physical print media substrate for images.

An interaction between a user and a device (e.g., printing, scanning, copying, etc.) is defined herein as a job. A "print job" or "document" is normally a set of related sheets, usually one or more collated copy sets copied from a set of original print job sheets or electronic document page images, from a particular user, or otherwise related. A print job generally includes a "printing object," which consists of one or more document images in a suitable format that is recognized by the printer, together with a "job ticket," which provides information about the print job that will be used to control how the job is processed, including the number of copies to be made. Where reference is made herein to processing operations related to the print job, such as requesting, collecting, storing, receiving, sending, etc., of a print job, this generally includes processing operations involving one or more of the printing object, its job ticket, information derived from the printing object and/or information derived from the job ticket, unless otherwise indicated.

A "network printing system," as used herein, incorporates a plurality of shared devices, which are accessible to one or more workstations, such as personal computers.

Figure 1:
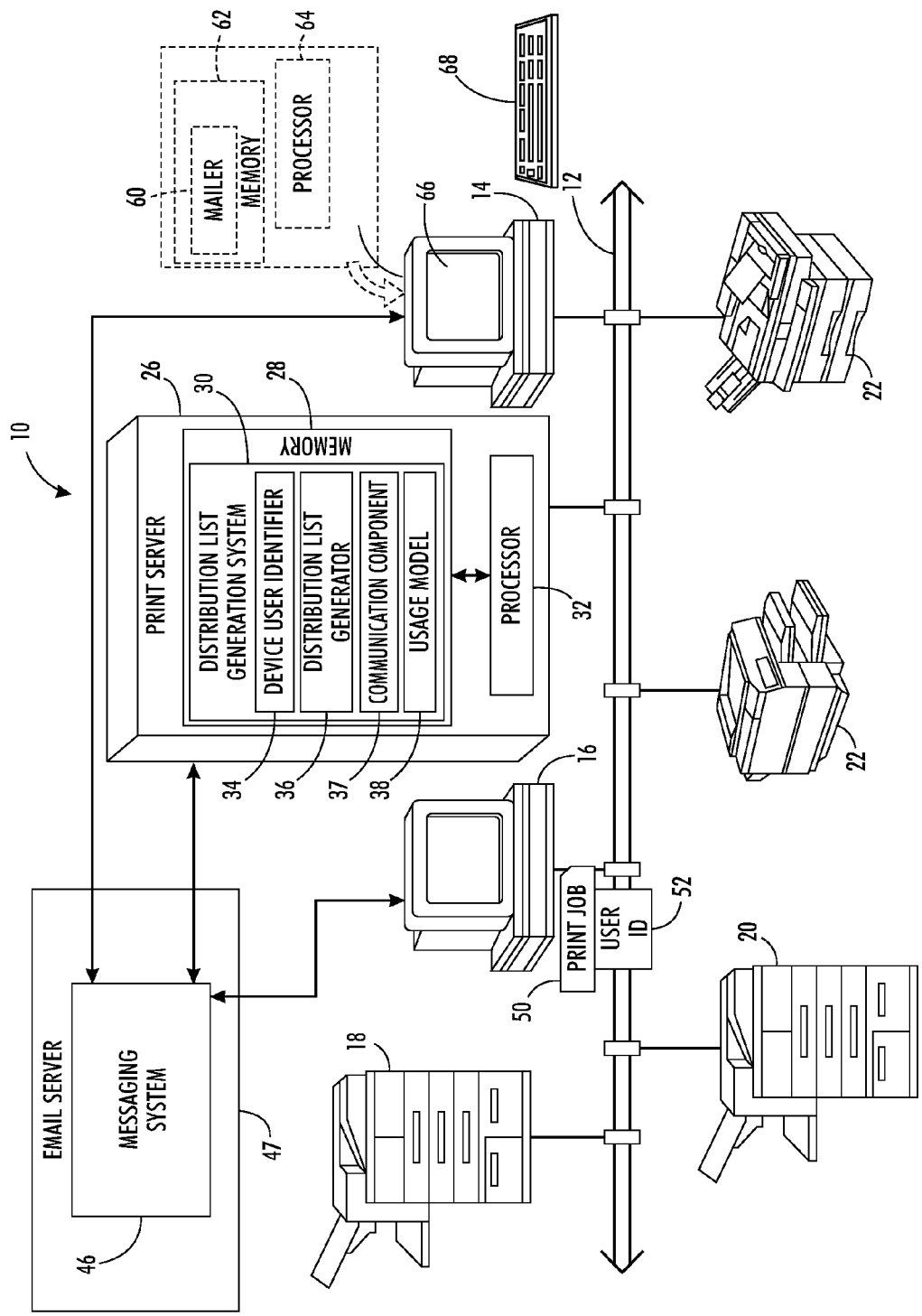
FIG. 1 is a block diagram illustrating a network printing system in accordance with one aspect of the exemplary embodiment.

FIG. 1 is a simplified diagram showing a network of shared devices in which the embodiments described herein may operate. In FIG. 1, a networked printing system 10 includes a wired or wireless network 12, which links various computing devices with an organization of shared network devices. Existing on the network 12 are, for purposes of illustrating the embodiments, a plurality of computers 14 and 16, linked by the network to a respective one or more of a plurality of shared devices, here illustrated as printers, such as multifunction devices 18, 20, 22, and 24. Optionally, also provided on network 12 is a print server 26, which acts as a virtual printing device to which all or some print requests on the network 12 may be spooled before being sent to a physical device 18, 20, 22, or 24.

The exemplary network printing system 10 may be typical of those found in organizations where access to the network printers is limited to members of the organization, via their network accessible computers, and those permitted to copy hard copy documents on one of the printers, without requiring network access. While each network user may have access to several network printers via the network for printing print jobs, one of the printers is typically designated as the user's default printer, to which the user's print jobs are sent, unless the user elects to send the job to a different printer.

In the embodiment shown in FIG. 1, the print server 26 hosts, in computer memory 28, a distribution list generation system 30, which includes software instructions that are executed by an associated computer processor 32 in performing the exemplary method described with reference to FIGS. 2 and 3. System 30 includes a device user identifier 34, and a distribution list generator 36, a communication component 37, and a usage model 38.

Each device 18, 20, 22, or 24 may generate usage logs, in the form of electronic data, which, among other things, include details of each print job performed on the device, such as the number of pages, whether the job is color or monochrome, and the like, as well as a time stamp for the job, and the User ID, if available. The usage logs may be stored in memory on the respective device or elsewhere in the system 10. The usage logs thus reflect the actual day-to-day usage of the device 18, 20, 22, or 24 by the device users, during operation of the device on the network.

Figure 2:
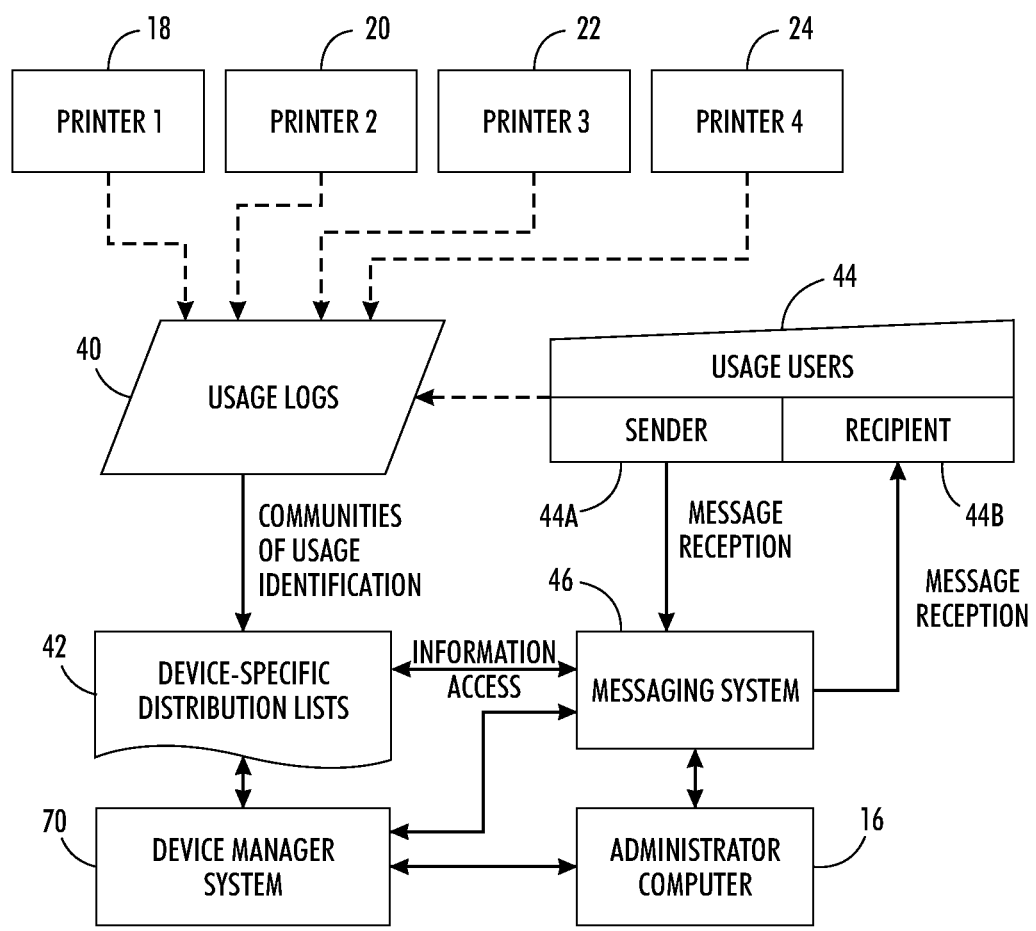
FIG. 2 schematically illustrates communication within the network printing system of FIG. 1.

With reference also to FIG. 2, the device user identifier 34 receives logged usage data 40 from devices 18, 20, 22, and 24 (or from print server 26). The device user identifier 34 analyzes the usage logs to identify, for each device, a community of usage, which is a set of users, based on the logs 40. The distribution list generator 36 applies rules for refining the community of usage for generating one or more device-specific distribution lists 42 for one or more of the shared devices 18, 20, 22, and 24. In addition to defining a distribution list of users associated to a specific device, the distribution list generator 36 may also identify users that are associated with a specific functionality (e.g., users that often print in color, e.g., for at least a threshold percent of their print jobs). The generated lists 42 are exported, periodically or on request, by a communication component 37. Over time, users 44 make use of the shared devices 18, 20, 22, and 24, by sending jobs to the devices, which in turn causes the devices or print server to generate usage logs 40.

Device centered distribution lists 42 can be created which target selected ones (or all) of the users in a community of usage. With the distribution lists 42, the group of users of a given device (or a designated subset of them) can be contacted electronically, e.g., through the illustrated messaging system 46. The messaging system may be resident on an email server 47 (FIG. 1), which is accessible to some or all of the computing devices 14, 16. Messaging system 46 has access to the distribution lists 42 via a wired or wireless link 48 to the communication component 37. While in the exemplary embodiment, messaging system communicates with users by use of email, other messaging systems can be utilized, such as instant messaging (SMS) or phone messages.

The device user identifier 34 may include a software architecture similar to those proposed in above-mentioned U.S. Pub. Nos. 20060132826 and 20060206445, incorporated herein by reference. The device user identifier 34 identifies the network users of a given shared device. Specifically, user communities for each shared device are automatically identified based on usage logs 40. The list of users is dynamically maintained, based on the identified user community, by the distribution list generator 36 so that it is up-to-date when needed.

In the exemplary embodiment, each printer 18, 20, 22, 24 generates its own usage log 40 which provide a record of usage of that printer. The usage log may provide a list of print jobs 50, each job being linked to a user ID 52, from which the user is identifiable. The user 52 ID may be acquired from the computer 14, 16 outputting the print job, e.g., from the job ticket which is associated with the print job. Or, in the case of a copy job, the user ID may be acquired through a login, an access card, an RFID, or the like.

Each job 50 may have a time stamp indicating when the print job was received/performed. The usage logs 40 may be output to the distribution list generation system 30 periodically, such as once a day, and stored in temporary memory, e.g., on the server. Alternatively, the logs 40 may be forwarded from the devices 18, 20, 22, 24 in real time, as generated.

The device-specific distribution list 42 generated by the distribution list generation system 30 makes it possible to contact the group of users of a given shared device electronically. In particular, each computer terminal 14, 16 includes a mailer program 60, stored in computer memory 62, which is executed by a processor 64, such as the computer's CPU (FIG. 1). The mailer program allows users to receive, view, compose, and send emails, e.g., with the aid of a display 66, which displays an interface for the mailer program 60, and a user input device 68, such as a keyboard, keypad, cursor control device, touch screen, or combination thereof. The mailer program 60 is in communication with the messaging system 46. The mailer program 60 allows a sender 44A to select, as an addressee, "printer X users", where X can be an identifier for the printer, such as its given name (e.g., NW printer or 1st. Floor printer). The sender can, for example, type in the addressee name or select it from the user's address book. The sender 44A of the message does not necessarily know the names of recipients 44B and does not need to have access to the distribution list.

It is to be appreciated that where reference is made herein to memory, such as memory 28, the memory may represent any type of computer readable medium such as random access memory (RAM), read only memory (ROM), magnetic disk or tape, optical disk, flash memory, holographic memory, or combinations thereof, which may be physically resident in the same or separate computing devices. Where reference is made to a processor, such as processor 32, it is to be appreciated that the processor is a digital processor capable of execution of instructions stored in memory, and can be variously embodied, such as by a single-core processor, a dual-core processor (or more generally by a multiple-core processor), a digital processor and cooperating math coprocessor, a digital controller, or the like. The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
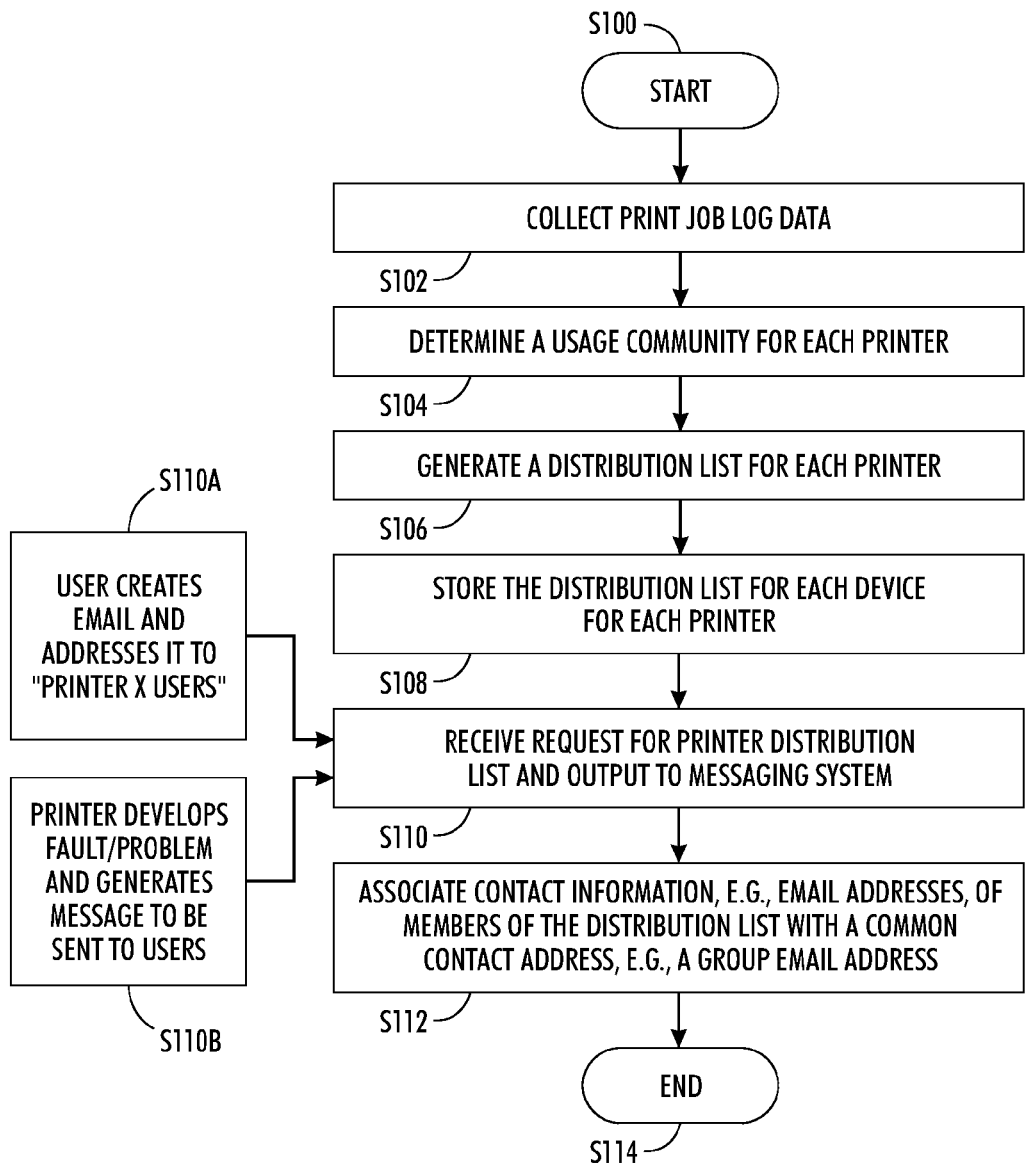
FIG. 3 illustrates a method-of generating and using a device-centered distribution list in accordance with another aspect of the exemplary embodiment.

FIG. 3 illustrates a method for generating and using a device-related distribution list, which may be performed in the system of FIG. 1.

The method begins at S100. At S102, print job log data is collected from each of the printers.

At S104, a usage community is determined for each printer. The community may be determined periodically, and the list of members updated, or may be determined only after a request for the list has been received. For example, by using a software architecture similar to those proposed in U.S. application Ser. No. 11/137,565, filed May 26, 2005, entitled "PROBABILISTIC MODELING OF SHARED DEVICE USAGE," by ANDREOLI, et al., the network users of each device are identified.

At S106, a distribution list is generated for each printer, based on the usage community/usage logs. The distribution list identifies at least a subset of the users in such a way that they can be linked to their email addresses. For example, the distribution list may include, for each listed user, the user's email address, a unique ID of the user, or the name of the user. Since the usage communities are automatically identified based on usage logs, the distribution list for each device can be dynamically maintained and thus kept up-to-date.

At S108, the distribution list for each device is stored in computer memory accessible to the network.

At S110, a request is received for the updated distribution list (e.g., from a mailer program or a printer) and the distribution list or link thereto is output.

At S112, contact information, e.g., email addresses, of members of the distribution list are removably associated with a common static contact address, e.g., a group email address. In this way, the common email address can remain static even though the associated email addresses may change over time as the distribution list(s) changes.

For example at S110A, a user addresses an email to the users of a printer. The common email address is linked to the email addresses of users on the distribution list, who subsequently receive the email when sent. Or, at S110B, a printer develops a fault and automatically sends a message to alert its users. The messaging system sends the message to one or more users on the distribution list.

The method ends at S114.

The method illustrated in FIG. 3 may be implemented in a computer program product that may be executed on a computer. The computer program product may be a computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use. Alternatively, the method may be implemented in a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, can be used to implement the method of generating and/or using a device-centered distribution list.

Various aspects of the system and method are now described.

Distribution List Management

The distribution list of users for a device can be stored, for example, on the email server 47, or elsewhere in the network, such as on a device-centric server such as the Xerox Device Manager. It may be desirable to preserve the user anonymity in certain settings, so the content of the list may be kept private. For an email-based implementation, a convenient method for addressing the distribution list 42 of a device is by providing a collective name for the users of each printer, such as 'Printer X-users.' Such a distribution list can be managed on the central email system 46 or, alternatively, managed by device management software. Depending on where the list is stored, the domain part of the email address may change, e.g., Printer1users@ABCCo.com or Printer1usersdistributionlist storage.ABCCo.com. Device users, and others with access to the distribution lists, can then use the mailer program 60 to interact with users in the community of usage of a certain device. In other embodiments, the print-driver located on the user's computer 14, 16 may play a role either by being the primary way to send a message or by providing a convenient way to retrieve the distribution list name.

Additionally, each of the printers 18, 20, 22, 24 may be linked to the messaging system for sending automatically generated emails to users on the distribution list of the same or a different printer. The users on a distribution list 42 may be identified by their email address, or alternatively by their network login name.

Management of the Distribution List Membership

Initial generation of the lists: The first time that the distribution lists 42 are generated, all users who maintain a threshold level of usage of a printer in a given time period (e.g., three or more pages per week, on average) are considered as candidates for inclusion on the distribution list. The candidate users may be polled, e.g., via email, to confirm that they would like to be on the list. At that time, some or all of the users may be asked whether they are willing to take on a specific distribution list role, such as serve as a main contact for that printer. One or more of the users may be designated as the main contact, based on the responses. U.S. Pub. No. 2006/0132826 and U.S. application Ser. No. 11/137,565 provide efficient algorithms to create communities based on past usage logs. In practice, three weeks of logs are sufficient to identify the main communities.

In some embodiments, all users having at least a minimum level of usage of a printer are automatically added to the distribution list and have no opportunity to opt out, other than by ceasing to meet the required usage level in a given time period.

In one embodiment, the distribution lists may be generated/updated upon an administrator request. For example, the communication component 37 provides the list of user communities which can be validated or discarded manually by the administrator.

In another embodiment, the distribution list is maintained automatically, without the input of an administrator. In one embodiment, it may be updated every time the community of usage changes. In other embodiments, it may be updated periodically, e.g., at regular or irregular intervals, such as weekly or monthly.

Updating of the lists: As noted, update of the distribution lists may be performed periodically. For example, if a user does not use a printer for a given time period or with a given threshold amount of usage (e.g., zero jobs in two months), then he may be considered as a candidate for deletion from the distribution list of a particular printer. In one embodiment, a message is automatically sent to the deletion candidate to ask if he still wants to be part of the community. If he responds that he does not wish to be part of the community/on the distribution list for that printer, or gives no answer, then he is removed from the distribution list. In other embodiments, a user is dropped automatically from the distribution list if he does not meet the threshold usage requirements for being maintained on the list. If a user not currently on the distribution list exhibits at least a threshold level of usage (e.g., three or more pages per week, on average), he is considered as a candidate for inclusion on the distribution list. He may be automatically added to the distribution list, or may be added once he has been contacted to confirm that he would like to be on the list. Depending on the internal policy, he may be able to refuse the membership.

Self-service membership management: optionally, a user can opt out or apply to join a distribution list on a voluntary basis. In general, however, the distribution list reflects actual usage and automatically adapts to the actual usage, which can be performed without the need for human intervention.

Device-Triggered Communication

A device 18, 20, 22, 24 may exploit its user community in a variety ways. In particular, it may announce important events to its users, via the static email address, such as one or more of the following:

Machine state events: Events particular to a device, such as started, halted, out-of-paper, or the like can be communicated to the printer's distribution list. Although, many print drivers can already provide this information to users submitting print jobs, it may be useful, in some cases, to be able to alert all users on the distribution list.

Machine-requests: a device requiring a repair or other user action can communicate its need to the user community and the members can use the same medium, e.g., email, to organize how it will be fixed, once the conversation has been initiated by the machine. In one embodiment, an incentive is provided for the repair. For example, as described in above-mentioned U.S. application Ser. No. 12/164,384 a reward mechanism may be used to obtain quicker repairs.

Alternatively, the device may decide send its request to a subset of the usage community members in order to reduce the number of communications, and therefore the level of annoyance for the users. For example, a model 38 (FIG. 1) may be built over time, which identifies the relation between the number of requests sent and the time to fix the device. Such a model may be generated, e.g., by the system 30 and/or printer, and stored on the printer, or elsewhere in the network 10. The model may be coupled with a simple cost model of the sent request, such as a linear model (cost being expressed, for example, as an annoyance cost to each person on the distribution list contacted). In this way, the printer can then compute the optimal number of requests to send while minimizing the number of requests.

Linking Communities

For some applications, it may be useful to establish links among usage communities. For example, topological links can be established among communities of devices located nearby each other. Proximity can be recognized by use of the methods described in above mentioned U.S. Pub No. 2006/0132826 and U.S. application Ser. No. 11/137,565. The principle behind these techniques is that users tend to interact with devices that are physically close to them, so that the usage logs can be used to evaluate distances between devices. For example, a user who finds his usual printer out of action will typically print a job on the nearest available printer. Thus the degree of overlap between the community of users of one printer and the community of users of another printer can be used as an indicator of device proximity—the greater the degree of overlap, the closer in proximity the two printers can be inferred to be. To make use of such a link, a user may use a static email address such as printer1local@ . . . which is automatically linked by the mailer program to the static email address for Printer 2, if that is the nearest printer to the user. Or, if the user knows that Printer 2 is the closest printer, may simply address the message to Printer 2's static email address.

A typology link can be established between communities using the same type of printer. For example, a user may send an email to printer1type@ . . . , which is automatically linked by the mailer program to the static email address of Printer 1 and additionally the static email addresses of any printers which are the same or similar in configuration to Printer 1.

Linking communities by topological or typology links is useful since the linked communities may have common interest and issues. For example, a user may wish to contact other users of the same type of device to obtain feedback on how to use the device, locate consumables, how to repair the device, and the like which may be obtained by emailing not only the distribution list of the user's community but also distribution lists of typologically linked printers. As another example, a user may wish to determine whether a local printer which is not the user's community printer, is operational and may email the distribution list of the local printer.

Structuring of Communities

It may be useful to structure the community of usage a device, for restricting certain types of contacts to a subset of the members of a given distribution list.

One or more of the following subgroups of members may be identified:

Primary Users: these are users sending most of their jobs to this device.

Designated Users: designated users are those who have a special role with the device, for example as a contact person for the manufacturer or service contract provider or a local specialist for helping colleagues. In some embodiments, the designated user or users can be selected according to printer usage, e.g., based on the number of printed pages or number of jobs they have sent to the printer within a designated period. In some embodiments, designated users can refuse to accept the role by unsubscribing from the mailing list (e.g., through an automatic feedback system). In the case where there is no designated user (e.g., all designated users unsubscribed or fail to answer requests, then a new user is selected (e.g., by descending order of device usage, as initially, but without the prior designated users).

Regular Users: these are all the users that have a threshold of usage which is higher than that required for membership of the distribution list (e.g., those who have used the device at least once during the past few weeks).

Responsive Users: these are users who are more likely than others to respond to a request for repair, based on their prior responsiveness.

Functionality Users: these are users which are associated to a specific functionality (e.g., users that often print in color).

Past Users: these are users who no longer use the device at the threshold level for membership of the distribution list, i.e., the system believes that they no longer use the device.

A distribution list can be generated for each of these device user sub-groups. Each of these sub-groups can be assigned an individual sub-group email address, such as Printer 1-primary users@ . . . .

Thus, in the case where a device is seeking a repair, the community structure can be utilized to enforce some organizational policy or simply reduce the number of annoying emails, by only targeting, for example, one of the sub groups.

In other embodiments, the printer may be used as a physical bulletin board. E.g., the screen of the device can display a message from a user to users on the device's distribution list.

Example Uses

The exemplary method and system described herein can automatically create and maintain appropriate email distribution lists of users of a device such as a MFD. Based on the analysis of a usage log, distribution lists are maintained and optionally structured, so that the device can communicate with appropriate people on the list. User-user and support-user communications are also facilitated. A distribution list management system provides ways to manage the creation or modification of lists. Based on the existence of such up-to-date lists, the system is able to communicate with the right people, particularly in the case of a problem. Non limiting examples include:

1. Identification of a contact person: Remote management of a print infrastructure can be improved by identifying, for each device 18, 20, 22, 24, one contact person among the users at the site. Identifying such contact persons can be achieved from information about the roles and habits of the local community of device users. Having established a contact person, the system 10 reports to a remote management system when the selected contact person is no longer within the user community of a device and provides a list of candidates for a new contact person.

2. Communication: In some organizations in which employees each generate relatively few documents, a single MFD may be shared by about fifty or one hundred 100 users. This raises several problems. For example, when such a printer is paper-jammed, it is difficult to decide whether or not to alert all 100 users and how to identify these users as some employees may have left the company. If the problem is not corrected promptly, the print queue could grow excessively and create an additional problem.

The exemplary method can be used to define an up to date distribution-list of users associated to a specific device and either send a message to the distribution list of all users or to a selected sub group of the users.

Another problem which the exemplary system can address is in the detection of soft failures. These are printer malfunctions which the printer is not itself able to detect, but can be "observed" thorough the change in usage patterns of the printer users. In one embodiment, the system 10 makes use of a soft failure detection system (e.g., in the form of an algorithm which may be stored in system memory, such as memory 30 and executed by a processor, such as processor 32) that dynamically analyzes print jobs to detect abnormal user behaviors that are likely to be caused by a device failure. Such a system is disclosed in above-mentioned U.S. application Ser. No. 11/436,819 filed May 18, 2006, entitled "SOFT FAILURE DETECTION IN A NETWORK OF DEVICES," by ANDREOLI, et al. For example, an abnormally high usage of Printer 2 by users which the system identifies as being on Printer 1's distribution list is detected, but no fault has been reported by Printer 1. The detection system may not know if this is because there is a fault of the type that the printer is not able to detect or if there is a non-fault related reason, such as a large print job is being processed on printer 1, and other users of Printer 1 want their jobs processed promptly. A message is automatically sent to some or all of the members of the Printer 1 distribution list asking if there is a fault with printer 1. The user feedback is then taken into account to improve the soft failure detection system, as disclosed, for example, in U.S. application Ser. No. 12/328,276, filed Dec. 4, 2008, entitled "SYSTEM AND METHOD FOR IMPROVING FAILURE DETECTION USING COLLECTIVE INTELLIGENCE WITH END-USER FEEDBACK," by BOUCHARD, et al. In this case it is the system, rather than a user, which can decide to send an email to a subset of the users in order to collect feedback.

Another problem is how to share knowledge and repair/maintenance tips or best practices acquired as users gain experience on a daily basis efficiently. The users can simply address their messages to the static email address of their printer.

In another example, a user identifies a problem on one of the printers (Printer 1) and emails the IT support team to let them know that that there is a problem. Conventionally, the other users of the broken device are not contacted, and unless there is a written message on the unavailable printer, several similar messages could be sent to the IT support. In the exemplary embodiment, the IT person receiving the message can reply to the user to let him know what action is being taken and copy the other users on the printer's up-to-date distribution list, e.g., by entering "Printer 1 users" or other predefined generic description in the cc, which calls up the updated list and associates the list of Printer 1 users with the Printer 1 users' email addresses.

In another example, someone observes that the wrong type of paper is often fed into one of Printer 2's paper trays, and wants to warn the co-users about this mistake in order to prevent it. Or, a user is going to print a large job on Printer 2 and wants to notify his-co-users about this. The user can draft an email and address it to "Printer 2 users". The mailer 60 on the user's computer requests the list from the communication component 37 or messaging system 46 and associates the list of Printer 2 users with the Printer 2 users email addresses.

Other examples include the ability to request users of a printer not to print large print jobs for a certain period, for example, because the user has to prepare documents to meet a specific deadline; the ability to ask other users for something, for example, instructions on how to perform a particular task on the printer or how to correct a problem with the printer. The system also allows a user of one printer to contact user communities of other printers. For example, a user of Printer 1 realizes that the printer is out of toner or other device consumable and there are no replacements in that location. The user would like to contact one or two persons in other device communities around the devices to check that some consumable is available, before walking to the place. The user sends an email to the designated users for the printers.

Figure 4:
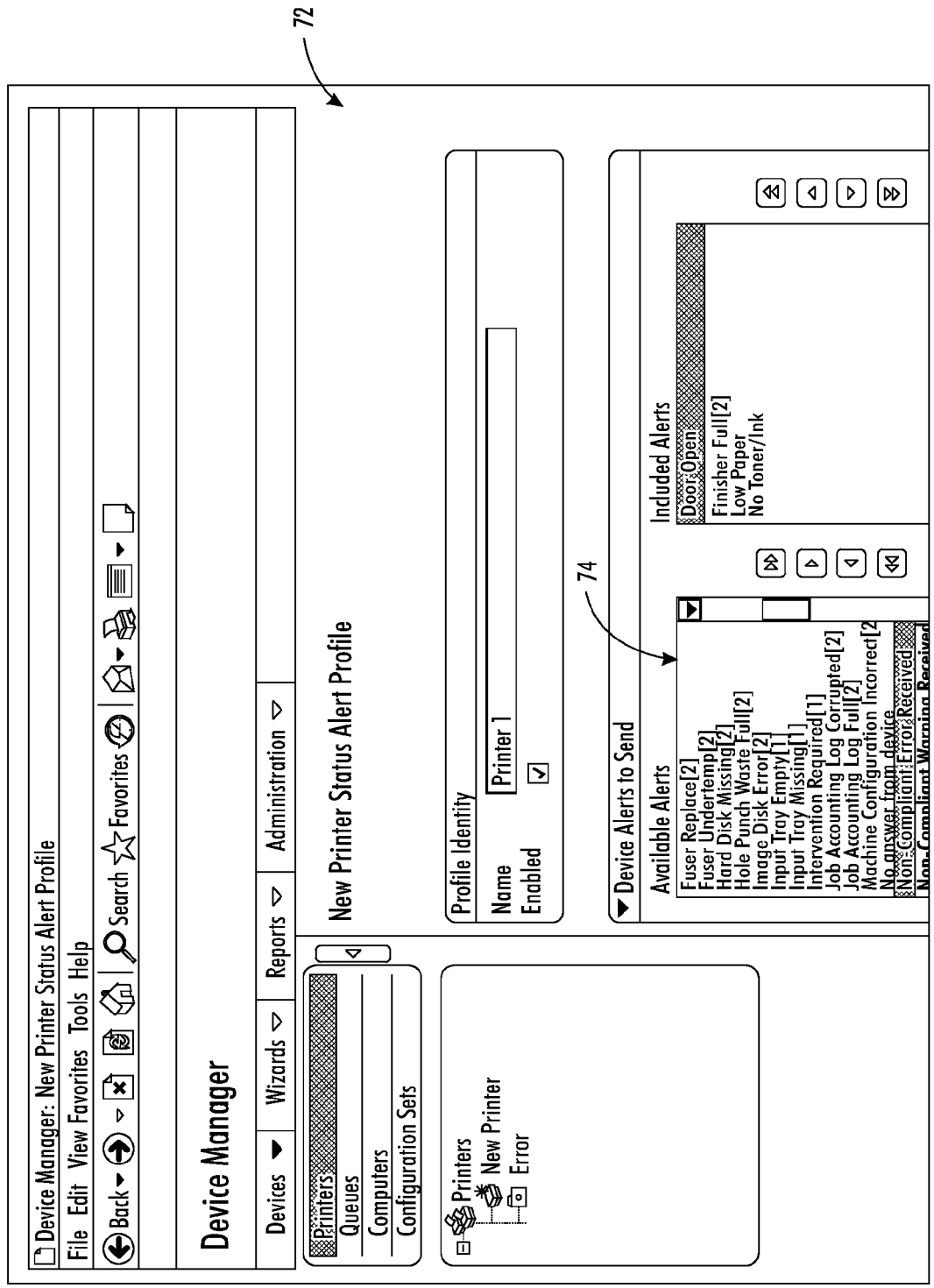
FIGS. 4 and 5 illustrate screen shots generated by a device manager system for assisting an administrator in selecting distribution lists for automatically receiving specified alerts.
Figure 5:
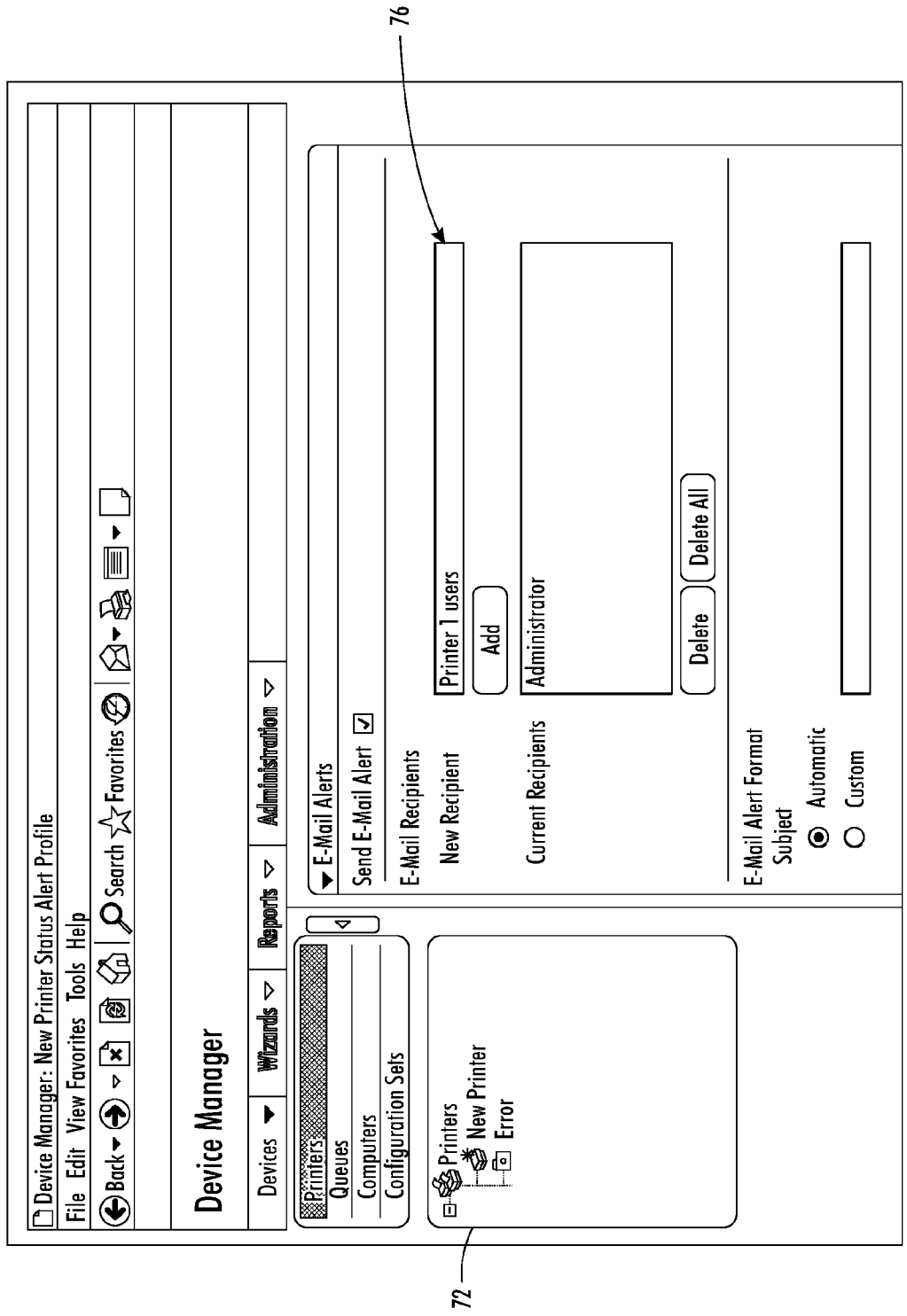

In another example, the administrator may wish to enter the network configuration for a device for accessing some email service, via SMTP. The administrator may access a device management program 70 such as the Xerox device manager, which displays a GUI 72 as shown in FIGS. 4 and 5. Through the GUI, the administrator identifies a device (Printer 1), the types of alerts to be communicated (through drop down box 74, FIG. 4) and the group or sub-group of users to be notified about this alert (in a dropdown box 76, FIG. 5). By specifying the recipients generically, e.g., "Printer 1 users", the recipients receiving the alerts change as the Printer 1 distribution list is updated.

Use of such automated email alerts can facilitate customer repair of the devices, by targeting a specific user group. This reduces the annoyance to other users on the network which would occur if a global distribution list were to be used. Also, by targeting a small sub-group, the recipients are aware that they are expected to respond, whereas a global alert will more likely be ignored by everyone, on the assumption that someone else will attend to the problem. The automatic identification of the users that are good at performing a particular task can also be helpful in many situations.

There is also a cost reduction in that the time of the administrator can be saved through the automatic identification of the main user of a given device, which simplifies or automates the identification of the contact persons for a given device. The method also enables better handling of device failures: some problems can be solved more efficiently if the main users of a device are contacted.

The method also provides advantages by linking users that would not communicate with each other otherwise, to increase knowledge sharing.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
   collecting job log data for a shared device, the shared device comprising a network printer;
   determining a usage community comprising users of the shared device, based on the job log data, including identifying users that have met a threshold usage of the device in a predetermined time period;

generating at least one distribution list based on the usage community which links users in the usage community to their email addresses;

structuring the distribution list into a plurality of sub-groups, each with a different membership criterion, based at least in part on the job log data, the plurality of sub-groups including:
 a) a sub-group of primary users, who are identified as being users sending most of their jobs to the device;
 b) a sub-group of designated users, who have a special role with the device; and
 c) a sub-group of regular users, who meet a threshold of usage higher than that required for membership of the usage community;

linking the distribution list with a mailer program, whereby users in the usage community are grouped together under a common contact address and at least one of the sub-groups is associated with an individual sub-group contact address;

providing for automated alerts issued by the device to be sent the at least one of the sub-groups associated with the individual sub-group contact address; and updating the linked distribution list to reflect a change in the usage community based on the job log data.

2. The method of claim 1, further comprising providing for the shared device to communicate with users on the distribution list via the common contact address.

3. The method of claim 1, wherein the sub-groups further include at least one sub-group ace selected from the group consisting of:
 d) a sub-group of responsive users, who are users more likely to respond to a request for repair;
 e) a sub-group of functionality users, who are associated to a specific device functionality, based on a threshold of usage of the specific device functionality; and
 f) past users, who no longer use the device at the threshold level for membership of the distribution list.

4. The method of claim 1, further comprising associating each of the sub-groups is with its own respective common contact address.

5. The method of claim 1, further comprising providing for users in the usage community to be notified when their usage of the shared device no longer qualifies them for membership of the usage community.

6. The method of claim 1, wherein users in the usage community are provided with the opportunity of being dropped from at least one of the at least one distribution lists.

7. The method of claim 1, further comprising providing for the device to send an automated message to users of at least one of the at least one distribution lists by addressing the message to the group contact address.

8. The method of claim 1, whereby the identities of at least some of the users in the usage community that are grouped together under the common contact address are not accessible to others of the users in the usage community via the mailer program.

9. The method of claim 1, further comprising providing for automated alerts issued by the device to be linkable to a selected one of the common contact address and the individual sub-group contact address.

10. The method of claim 1, wherein the shared device further comprises a plurality of shared devices and the method includes generating at least one distribution list for each of the shared devices based on its usage community and linking the distribution lists with a mailer program, whereby users in a first usage community are grouped together under a first common email address and users in a second usage community are grouped together under a second common email address.

11. The method of claim 10, further comprising providing for a user of the first usage community to send a message to at least one user in the second usage community through the second common email address.

12. The method of claim 1, further comprising receiving message addressed to the common email address, retrieving the updated distribution list, associating email addresses with the members of the updated distribution list and sending the message to the associated email addresses.

13. A computer program product comprising a non-transitory computer-readable recording medium encoding instructions, which when executed on a computer causes the computer to perform the method of claim 1.

14. The method of claim 1, wherein the identifying users includes adding to the usage community users who have met the threshold of usage of the device in a predetermined time period and deleting from the usage community, users who have not met a threshold of usage of the device in a predetermined time period.

15. The method of claim 1, further comprising detecting a soft failure of the shared device through an abnormally high usage of a second shared device by the usage community.

16. The method of claim 1, wherein an automated alert is issued to a sub-group of the usage community based on one of a plurality of predefined machine state events.

17. A distribution list generation system comprising:
 memory which stores instructions for:
  receiving job log data from a plurality of associated shared devices,
  for a first of the plurality of shared devices, determining a usage community comprising users of the first shared device, based on the job log data,
  generating at least one distribution list based on the usage community,
  structuring the distribution list into a plurality of sub-groups, each with a different membership criterion, based at least in part on the job log data, the plurality of sub-groups including:
   a) a sub-group of primary users, who are identified as being users sending most of their jobs to the device;
   b) a sub-group of designated users, who have a special role with the device; and
   c) a sub-group of regular users, who meet a threshold of usage higher than that required for membership of the usage community;
  receiving additional job log data from the plurality of associated shared devices,
  updating the distribution list to reflect a change in the usage community, the change in the usage community being based on the additional job log data,
  outputting the updated distribution list to a mailer program, whereby users in the usage community are able to be grouped together under a common contact address, and each of the plurality of sub-groups is associated with a respective sub-group common contact address; and
  providing automated alerts issued by at least one of the plurality of associated shared devices to at least one of the plurality of sub-groups by the associated sub-group common contact address; and
 a processor in communication with the memory for executing the instructions.

18. The distribution list generation system of claim 17, wherein the instructions comprise:

for a second of the plurality of shared devices, determining a second usage community comprising users of the second shared device, based on the job log data, generating at least one second distribution list based on the second usage community, and outputting the second distribution list to an associated mailer program, whereby users in the second usage community are able to be grouped together under a second common contact address.

19. A network printing system comprising the distribution list generation system of claim 17 and a plurality of shared printers which output usage logs to the distribution list generation system.

20. The network printing system of claim 19, further comprising the mailer program.

21. A method for generating device-centered distribution lists for a plurality of printers comprising:

for each of a plurality of shared printers:

collecting job log data;

with a processor, determining a usage community, based on the job log data;

generating at least one updatable distribution list of users based on the usage community;

structuring the distribution list into a plurality of sub-groups, each with a different membership criterion, based at least in part on the job log data, the plurality of sub-groups including:

a) a sub-group of primary users, who are identified as being users sending most of their jobs to the device;

b) a sub-group of designated users, who have a special role with the device; and c) a sub-group of regular users, who meet a threshold of usage higher than that required for membership of the usage community;

providing for email addresses for at least a subset of the users listed on the distribution list to be removably linked to a common, static email address; and providing for automated alerts issued by one of the printers to be linkable to the common static email address.

* * * * *